United States Patent Office 2,869,305
Patented Jan. 20, 1959

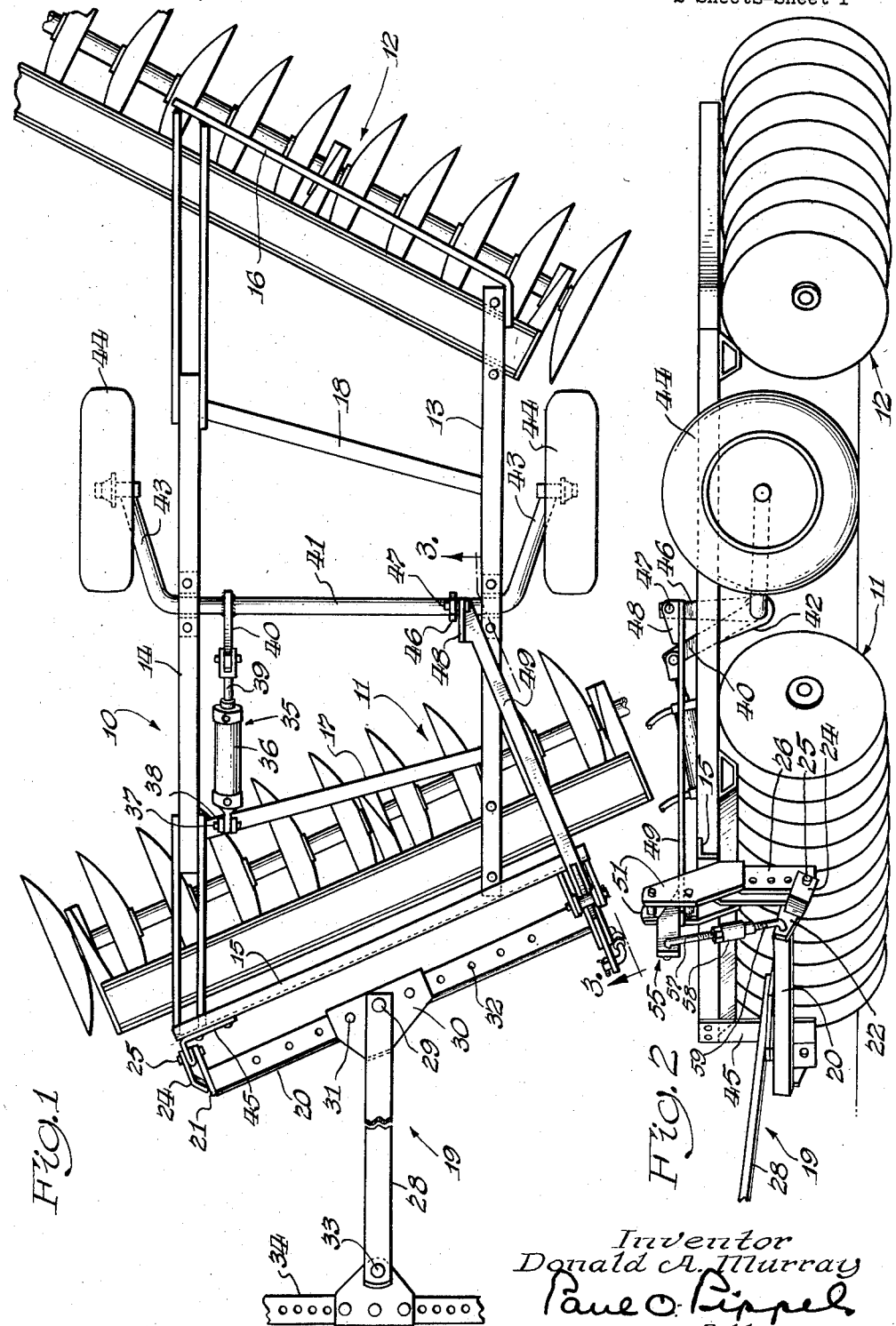

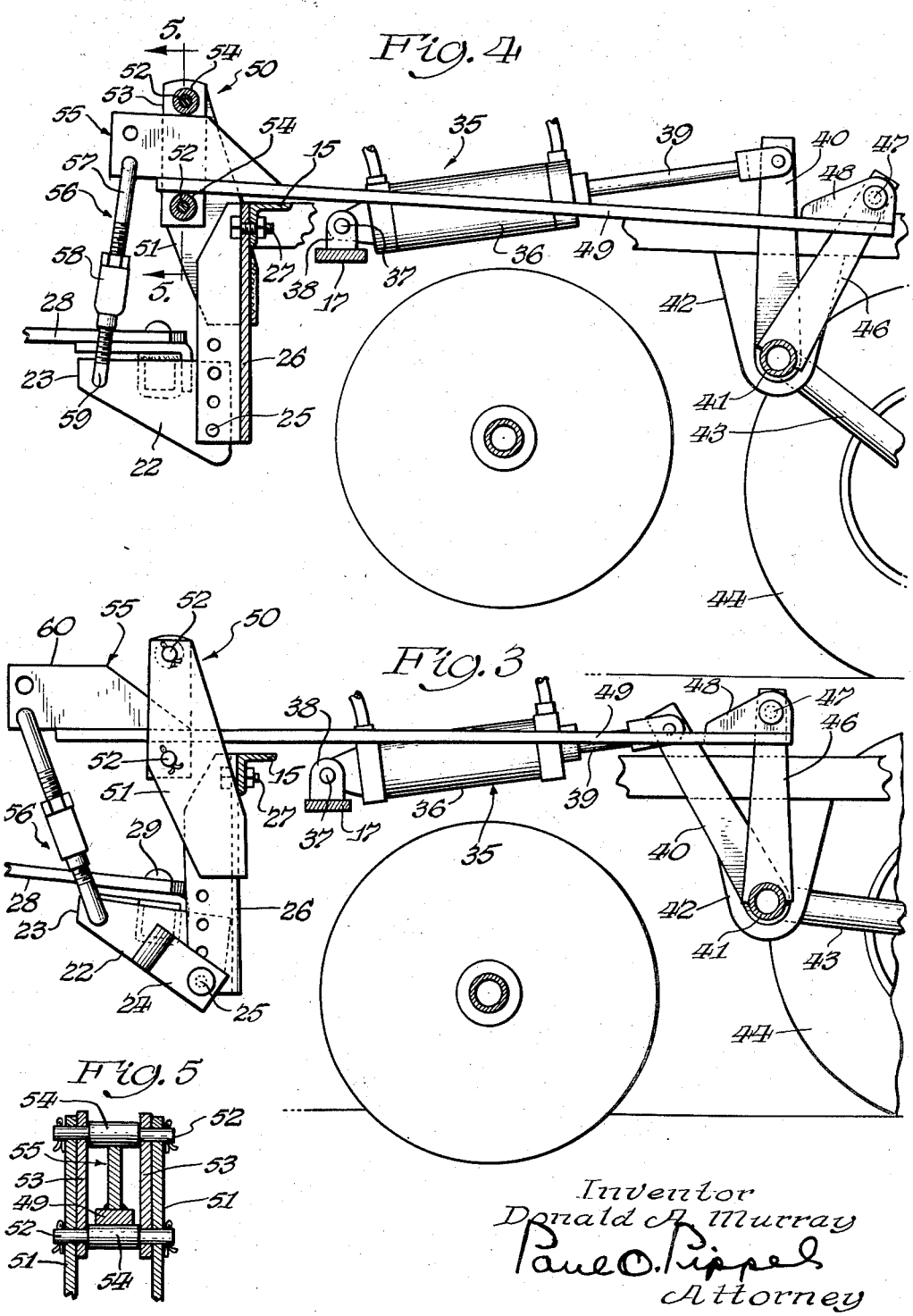

2,869,305

WHEEL CONTROLLED HARROW

Donald A. Murray, Stockton, Calif., assignor to International Harvester Company, Chicago, Ill., a corporation of New Jersey Application December 12, 1957, Serial No. 702,294

6 Claims. (Cl. 55—73)

This invention relates to agricultural implements and particularly to wheeled implements adapted to be propelled by a tractor or the like. More specifically the invention concerns a disk harrow and control means therefor.

An object of the invention is the provision in an agricultural implement mounted on a wheel supported frame, of novel means accommodating floating of the implement in operation but adapted to hold it substantially level when raised to transport position.

Another object of the invention is the provision of novel stabilizing means for a trail-behind implement such as a harrow comprising tandem disk gangs supported by wheels mounted therebetween, wherein the tool-carrying frame and the hitch structure by which the implement is connected to a tractive vehicle are pivotally connected to permit the disk gangs to follow ground contour in operation but wherein the connection between these structures automatically becomes rigid when the implement is raised on its supporting wheels to transport position.

Other objects and advantages of the invention will become clear from the following detailed description when read in conjunction with the accompanying drawings wherein:

Figure 1 is a plan view of an offset disk harrow embodying the features of this invention;

Figure 2 is a view in side elevation of the structure shown in Figure 1;

Figure 3 is a sectional view along the line 3—3 of Figure 1;

Figure 4 is a view similar to Figure 3 showing the position of the parts when the implement is in operating position; and Figure 5 is a section taken on the line 5—5 of Figure 4.

In the drawings the numeral 10 designates the tool-carrying frame of an offset disk harrow comprising relatively angled longitudinally spaced front and rear disk gang units 11 and 12 mounted upon laterally spaced longitudinally extending frame bars 13 and 14 connected at front and rear ends by braces 15 and 16 and further strengthened by additional longitudinally spaced brace members 17 and 18.

Also forming part of the implement is a hitch frame 19 comprising a transversely extending angled hitch beam 20 to the ends of which are secured plates 21 and 22, the latter having a forward extension 23. To each of the plates 21 and 22 is secured a strap 24 pivotally connected by a pin 25 to the lower end of a bracket 26, channel shaped in cross section, affixed to the forward brace 15 by one or more bolts 27.

Also forming part of the hitch frame 19 is a longitudinally extending draft bar 28 pivotally connected by a pin 29 to a slidable member 30 slidably mounted on the hitch bar 20 and having a plurality of openings 31 therein adapted to register with a selected one of the openings 32 in hitch bar 20 to laterally adjust the position of the draft bar 28 with respect to the tool-carrying frame. The forward end of draft bar 28 is connected by a pivot pin 33 to a drawbar 34 of a tractor or other source of draft, not shown.

The offset disk harrow with which this invention is concerned is vertically moved between operating and transport positions by the provision of a hydraulic ram 35 comprising a cylinder 36 pivotally anchored by a pin 37 to a pair of lugs 38 affixed to the brace member 17. A piston rod 39 is slidable in cylinder 36 and is pivotally connected to the upper end of an arm 40 secured to a transversely extending shaft 41 rotatably supported at the lower ends of a pair of brackets 42 secured to the side frame members 13 and 14. The ends of shaft 41 are bent to form crank arms 43 supporting at their ends ground-engaging wheels 44.

In Figure 2 the implement is shown in its operating position. Vertical movement of the implement between operating and transport positions is accomplished by actuation of ram 35, which receives fluid under pressure from a source, not shown, on the tractive vehicle by which is it propelled. Extension of piston rod 39 in the cylinder 36 rocks the shaft 41 in a clockwise direction as viewed in Figure 2 to raise the tool-carrying frame 10 out of the ground to a position such as indicated in Figure 4. Retraction of the piston rod in the cylinder returns the implement to its working position.

By virtue of the pivotal connection of the implement to the tractor at 33, the implement is capable of lateral swinging relative to the tractive vehicle by which it is propelled. It has already been noted that the hitch frame 19 is connected to the tool-carrying frame 10 by means of pivot pins 25, the right-hand pivot pin 25 being connected to the lower end of a bracket 26 secured to the brace 15. It should be noted that the left-hand pivot pin 25 is connected to a bracket 45 which is also secured to and depends from brace 15. By virtue of this pivotal connection of the hitch frame to the tool-carrying frame, and a loose connection of pivot pin 33 with the drawbar 34, the implement is capable of vertical floating movement relative to the tractor, and the tool-carrying frame 10, by virtue of the pivots 25, is capable of vertical swinging relative to the hitch frame 19. In the operating position of the implement this is desirable to permit the implement to follow the contour of the ground. However, in transport position of the implement, due to the disposition of the ground-engaging wheels 44 centrally between the disk gangs 11 and 12, the implement tends to rock about the axis of the wheels, making it difficult to transport the implement and frequently damaging the disk gangs.

It is therefore desirable that the implement be stabilized and the disk gangs maintained substantially level when propelled over the ground in transport position. By means of the apparatus of this invention, the tool-carrying frame 10 is held substantially rigidly against pivoting about the axes of pins 25 with respect to hitch frame 19 in the transport position of the implement, although it is permitted to pivot freely in the operating position to allow the disk gangs to properly follow contour of the ground, this transition being accomplished automatically by mechanism now to be described.

Also affixed to shaft 41 is another arm 46, the upper end of which is pivotally connected by a pin 47 to a lug 48 affixed to the rear end of a longitudinally extending flattened bar 49, rectangular in section, which is slidably receivable in a guide 50.

Guide 50 comprises laterally spaced uprights 51 the lower ends of which are affixed to bracket 26 and the upper ends of which support a pair of vertically spaced pins 52 which extend therethrough and through a pair of plates 53 spaced by rollers 54 mounted on the pins and forming a slot for the sliding reception of the forward end of bar 49.

The forward end of the bar 45 is thickened and made rigid by the provision of an elongated upright flange 55 secured to the forward end of the bar, as by welding, and having a portion projecting therebeyond. The forward end of member 55 is pivotally connected to the upper end of a generally vertically extending link 56, comprising a threaded hook member 57 connected to the member 55 and having its threaded end received in a threaded sleeve 58 which also receives the threaded end of another hook member 59 pivotally connected to the extension 23 of plate 22. Link 56 is thus adjustable in length to regulate the position of hitch frame 19 with respect to tool-carrying frame 10.

Member 55 is provided with an upper horizontal edge 60 engageable with the upper roller 54 of guide 50 in the transport position of the implement as indicated in Figure 4, while the lower surface of the bar 49 engages the lower roller 54. In this position of the parts the hitch frame 19 is held substantially against vertical swinging about the pivots 25 relative to the tool frame 10, because the portion of member 49 and its extension 55 extending beyond the guide 50 is incapable of moving in a vertical direction.

Upon retraction of the piston rod 39 in cylinder 36 the parts move to the operating position indicated in Figures 2 and 3, bar 49 being shifted forwardly until the upper edge 60 of member 55 no longer engages upper roller 54. The bar 49 is now capable of vertical movement to accommodate pivoting of the hitch frame relative to the tool frame, and may, if desired, be flexible, lower roller 54 serving as a fulcrum for the forward overhang of the bar 49.

Upon again raising the implement in transport position the bar 49 is again shifted rearwardly until the forward portion of member 55 is engaged by and confined between the rollers 54 of the guide 50.

The operation of the stabilizing means of this invention should be clearly understood from the foregoing description. It should likewise be understood that the invention has been described in its preferred embodiment only and that modifications may be made therein without departing from the spirit of the invention or the scope of the appended claims.

What is claimed is:

1. In an implement including a tool-carrying frame and a longitudinally extending hitch frame pivotally connected at its rear end to the tool frame on a transverse axis for vertical swinging relative thereto, a wheel-carrying crank axle mounted on the tool frame and vertically swingable relative thereto to move the tool frame between operating and transport positions, an arm affixed to said crank axle and rockable upon swinging said axle, a guide member on the tool frame adjacent said hitch frame having means serving as a vertically extending slot therein, a longitudinally extending bar operatively connected at its rear end to said arm and at its forward end to said hitch frame and slidably receivable in said slot for longitudinal shifting therein in response to raising and lowering the tool frame, said slot serving to accommodate vertical movement of said bar and vertical swinging of said hitch frame in the operating position of the implement, the forward end of said bar having an enlarged portion adapted to fill said slot when the implement is raised to transport position and prevent vertical pivoting of the hitch frame.

2. In an implement including a tool-carrying frame and a longitudinally extending hitch frame pivotally connected at its rear end to the tool frame on a transverse axis for vertical swinging relative thereto, a wheel-carrying crank axle mounted on the tool frame and vertically swingable relative thereto to move the tool frame between operating and transport positions, an arm affixed to said crank axle and rockable upon swinging said axle, a guide member on the tool frame adjacent said hitch frame having means serving as a vertically extending slot therein, a longitudinally extending bar operatively connected at its rear end to said arm, said bar being slidably receivable in and having a thickness less than the length of said slot and having its forward end projecting from the slot in overhanging relation to a portion of the hitch frame, a pivoted link connecting the hitch frame to the overhanging end of said bar, said bar being vertically movable in said slot to accommodate vertical swinging of the hitch frame about its pivot on the tool frame, and an enlarged portion at the forward end of said bar of a thickness adapted to be received in and to fill said slot upon movement of the implement to transport position to prevent said vertical swinging of the hitch frame.

3. The invention set forth in claim 2, wherein said member comprises a pair of vertically spaced rollers mounted on the tool frame adapted to slidably receive said bar and to engage the upper and lower surfaces of said enlarged portion.

4. Stabilizing apparatus for a wheel supported implement such as a disk harrow wherein ground engaging wheels are mounted on a tool frame between tandem disk gangs for vertical movement to raise and lower the tool frame and wherein a hitch frame is pivotally connected to the tool frame for relative pivoting about a transverse axis, comprising in combination, a guide member mounted on the forward end of the tool frame above the pivotal connection of the hitch frame thereto, a longitudinally extending bar having floating movement in a vertical plane slidably engageable with said guide and operatively connected at its forward end to the hitch frame and at its rear end to said wheels for longitudinal shifting in response to vertical movement of said wheels relative to the tool frame, said bar extending forwardly beyond said guide member and the latter serving as a slot to accommodate limited vertical floating movement of the bar in the operating position of the implement, said bar being shiftable rearwardly upon raising the implement to transport position and having a rigid forward end portion of greater thickness than the main body of said bar adapted to be received and confined in said guide member to held the hitch frame against pivotal movement relative to the tool frame.

5. The invention set forth in claim 4, wherein said guide member includes rollers vertically spaced a greater distance than the thickness of the main body portion of said bar, said rollers being engageable with the upper and lower edges of the forward thickened end of said bar upon shifting of the latter rearwardly in response to raising the implement to transport position.

6. Stabilizing apparatus for an implement having a tool-carrying frame, a hitch frame connected thereto for vertical pivoting and ground-engaging wheel means mounted on the tool frame for vertical movement relative thereto to raise and lower the implement, comprising a longitudinally extending bar, movable in a vertical plane and operatively connected at its rear end to said wheel means to shift said bar longitudinally in response to vertical movement of said wheels, a pair of guide rollers mounted on the forward end of the tool frame and vertically spaced a distance greater than the thickness of said bar, the forward end of said bar projecting beyond said guide rollers to provide an overhang, a vertical link connecting the forward end of the bar to the hitch frame to accommodate vertical pivoting of the latter in the operating position of the implement, and a thickened rigid portion at the forward end of said bar having its upper and lower edges engageable with said rollers ot lock the bar therebetween upon shifting said bar rearwardly in response to raising the implement to transport position.

References Cited in the file of this patent

UNITED STATES PATENTS

| | | |
|---|---|---|
| 2,320,742 | Newkirk | June 1, 1943 |
| 2,458,091 | Moore | Jan. 4, 1949 |
| 2,580,100 | Johansen et al. | Dec. 25, 1951 |